(No Model.)
W. H. BROOKS.
CIRCULATOR AND GOVERNOR FOR PUMPS.
No. 367,088.  Patented July 26, 1887.
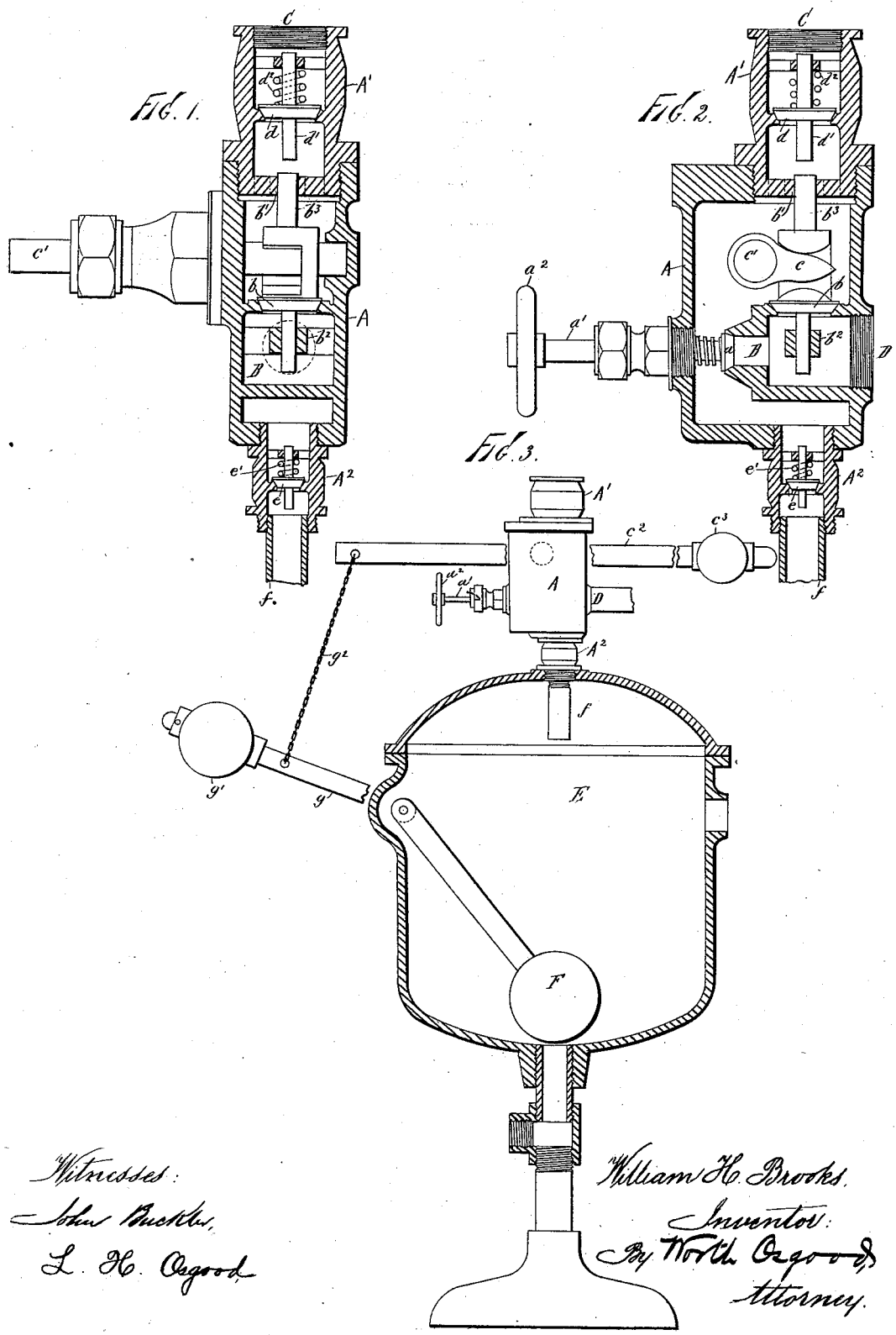
Witnesses:
John Buckler,
L. H. Osgood
William H. Brooks,
Inventor:
By Worth Osgood,
Attorney.

United States Patent Office.

WILLIAM H. BROOKS, OF WEST POINT, NEW YORK.

CIRCULATOR AND GOVERNOR FOR PUMPS.

SPECIFICATION forming part of Letters Patent No. 367,088, dated July 26, 1887.

Application filed April 13, 1887. Serial No. 234,637. (No model.)

*To all whom it may concern:*

Be it known that I, WILLIAM H. BROOKS, of West Point, county of Orange, and State of New York, have invented certain new and useful Improvements in Circulators and Governors for Pumps, of which the following is a full, clear, and exact description, reference being had to the accompanying drawings and to the letters of reference marked thereon.

My present invention has relation to means or apparatus designed to be applied upon a return-steam trap for the purpose of coverting the trap into an exhaust-steam pump-governor and circulator and boiler-feeder, which device or apparatus I call a "circulator and pump-governor," or a "circulator and boiler-feeder."

The object of my invention is to produce a simple, cheap, durable, and efficient apparatus of the character named, which may be used in connection with any closed receiver or trap having a float, and in connection with any pump, and when so used will operate (in connection with the receiver or trap) to permit a constant flow of exhaust-steam to the pump, by which the pump may be kept continuously moving, which will, as the float rises, gradually open the steam-outlet from the trap to a greater extent, which will, as soon as the float rises beyond a certain point, permit the flow of live steam to the pump, and which may be employed to convert the trap or receiver into an automatic boiler-feeder. To accomplish all of this, my improvements involve the application to the trap or receiver of a valve box or structure containing a circulator-valve, a governor-valve, and two check-valves, and certain peculiarities of construction and relative arrangements or combinations of parts and principles of operation, all of which will be herein first fully described, and then pointed out in the claims.

In the accompanying drawings, forming part of this specification, Figure 1 is a vertical section and partial elevation of my improved device detached from the receiver and trap, the view being taken upon a plane parallel with the axis of the rock-shaft. Fig. 2 is a similar view upon a plane at right angles to that of Fig. 1. Fig. 3 is a sectional elevation showing the device applied upon an ordinary float trap or receiver.

In all the figures like letters of reference, wherever they occur, indicate corresponding parts.

It has not been deemed necessary to represent the pump herein, as that may be of any of the well-known patterns and calculated to return the water of condensation to the boiler or to pump fresh water into the boiler, as occasion may require.

A is the shell or valve-box, and contains the two principal valves and their seatings—namely, the circulator-valve and the governor-valve. The circulator-valve is represented at $a$, and the governor-valve at $b$. Both these valves are seated in the walls of an inner chamber, B, through which steam must pass to drive the pump. The circulator-valve $a$ is intended to be operated and set by hand, having a projecting stem, $a'$, and hand-wheel $a^2$.

The governor-valve $b$ is automatically opened and closed. When the water passing through the receiver on its way to the pump rises within the receiver, it elevates the float, which latter causes the valve $b$ to rise, and when the water is exhausted from the receiver by the pump to such an extent as to permit the float to lower, then the valve $b$ is closed by the weighted lever. This valve $b$ is guided, as by the guides $b'$ $b^2$, and is moved by a cam or arm, $c$, connected with a rock-shaft, $c'$, extending to the exterior and supplied with a lever, as $c^2$, having an adjustable weight, as $c^3$. The valve-stem $b^3$ of valve $b$ projects through the guide $b'$, and, as it moves to a certain height, comes in contact with the stem of the live-steam check-valve and raises the latter valve from off its seat, as will be explained hereinafter. Between the top and bottom of the valve-box there is an open communication passing the inner chamber, B.

Upon the top of valve-box A is a casing, A', which contains a check-valve, $d$, seating downwardly. Live steam is admitted to the casing A' by any suitable pipe-connections at its top. The valve $d$ has a projecting stem, $d'$, arranged over the stem $b^3$ of valve $b$, and is supplied with a light spring, $d^2$, to insure its accurate seating.

Upon the bottom of valve-box A is a casing, A², which contains a check-valve, e, seating downwardly, and this is provided with a light spring, e', to insure its accurate seating.

C is the inlet for live steam, by which it may be desired to drive the pump or to increase the rapidity of its operations; and D is the outlet from the valve box or casing, through which all the steam must flow to the pump.

The device thus constructed and arranged is mounted upon the top of any receiver or trap, as E, having an inlet to it for exhaust-steam (and water) and an outlet from it for water, with which outlet the suction-pipe of the pump is connected.

Depending from the check-valve casing A² is a short pipe or tube, f, projecting down into the upper part of the receiver or trap. Exhaust-steam passes through this tube to the valve-box.

F is a float within the receiver or trap, and this is connected with lever $c^2$ through the medium of its arm g, having an adjustable weight, g', and by any suitable chain or rod, $g^2$. When the water in the receiver rises above a certain point, the float will, through its connections, move the shaft c', and thus cause the governor-valve b to rise, permitting a greater quantity of exhaust-steam to pass out to the pump through the port governed by valve b, by which the working capacity of the pump is increased. If the float should continue to rise, the valve-stem $b^3$ would come in contact with and raise the check-valve d, when live steam would enter the valve-box, passing to the pump through the port governed by valve b, and around chamber B, closing the check-valve e, thus preventing its admission to the trap or receiver. The live steam would accelerate the pump, and as the receiver became emptied the governor-valve would fall, permitting the check-valve d to close, and the pump be then driven only by exhaust-steam. While the valve b remains closed, exhaust-steam finds its way to the valve-box, and if the circulator-valve a be open a constant circulation of exhaust-steam to the pump is insured, and thus the pump kept continuously in motion. When the float descends far enough, the governor-valve is closed by the weight $c^3$.

If it be desired that the pump shall supply the boiler with cold water, all that is necessary is to admit the water to the receiver, which will cause the float to rise higher than by the condensed water alone, when the governor-valve and live-steam check-valve will be raised or opened, as before described, and the pump driven, as explained. It will thus be seen that with the improved device I am enabled to convert any of the ordinary return-steam traps into exhaust-steam governors and steam-boiler feeders, and can at the same time regulate the circulation by keeping the circulator-valve opened or closed to any desired degree.

The object in carrying the sleeve or tube f down below the top of the receiver or trap is to afford the steam opportunity to condense as thoroughly as it will before entering the valve-box.

The device is simple and cheap, and easily applied without requiring any alterations in the trap or receiver.

Having now fully described my invention, what I claim as new, and desire to secure by Letters Patent, is—

1. In combination with a return-steam trap or receiver, a valve-box containing a governor-valve automatically operated upon the rise of water in the trap or receiver, and a check-valve for live steam arranged to be moved or opened by the governor-valve, substantially in the manner and for the purposes set forth.

2. In combination with a return-steam trap or receiver, a valve-box containing a governor-valve automatically operated upon the rise of water in the trap or receiver, a check-valve for live steam arranged to be moved or opened by the governor-valve, and a check-valve in the passage leading from the trap or receiver to the valve-box, substantially as and for the purposes set forth.

3. In an apparatus of the character herein described, the combination, with the valve-box, of the governor-valve, the circulator-valve, and the two check-valves, arranged for operation substantially as shown and set forth.

4. In an apparatus of the character herein described, the combination, with the valve-box, of the governor-valve, the circulator-valve, the two check-valves, and the sleeve or tube extending down into the receiver or trap, substantially as and for the purposes set forth.

5. The combination, with the valve-box having the inner chamber and the two valves seated in the walls thereof, of the live-steam check-valve above the box and the live and exhaust steam check-valve below the box, said inner chamber being arranged to permit the passage of steam around it and within the valve-box, substantially as shown and described.

In testimony that I claim the foregoing I have hereunto set my hand in the presence of two witnesses.

WILLIAM H. BROOKS.

Witnesses:
 THOS. P. SCOTT,
 JOHN G. PAVEK.